(12) United States Patent
Mohler

(10) Patent No.: US 8,959,599 B2
(45) Date of Patent: Feb. 17, 2015

(54) PASSWORD MISMATCH WARNING METHOD AND APPARATUS

(71) Applicant: Avaya Inc., Basking Ridge, NJ (US)

(72) Inventor: David S. Mohler, Arvada, CO (US)

(73) Assignee: Avaya Inc., Basking Ridge, NJ (US)

(*) Notice: Subject to any disclaimer, the term of this patent is extended or adjusted under 35 U.S.C. 154(b) by 155 days.

(21) Appl. No.: 13/676,294

(22) Filed: Nov. 14, 2012

(65) Prior Publication Data

US 2014/0137216 A1    May 15, 2014

(51) Int. Cl.
  G06F 21/00  (2013.01)
  H04L 9/32  (2006.01)
  H04L 9/08  (2006.01)

(52) U.S. Cl.
  CPC .............. *H04L 9/32* (2013.01); *H04L 9/0844* (2013.01)
  USPC ........................................................... 726/5

(58) Field of Classification Search
  CPC ....... H04L 9/32; H04L 9/0813; H04L 9/3226; H04L 9/0844; G06F 2/30; G06F 21/44; G06F 21/45; G06F 21/46
  See application file for complete search history.

(56) References Cited

U.S. PATENT DOCUMENTS

| | | | |
|---|---|---|---|
| 8,510,811 B2 * | 8/2013 | Kuang et al. ................... 726/5 |
| 2008/0115208 A1 * | 5/2008 | Lee ................................ 726/19 |
| 2009/0187975 A1 * | 7/2009 | Edwards et al. ................ 726/4 |
| 2010/0199086 A1 * | 8/2010 | Kuang et al. ................. 713/155 |
| 2010/0306858 A1 * | 12/2010 | McLaren et al. .............. 726/28 |
| 2012/0209735 A1 * | 8/2012 | Subramanian et al. ...... 705/26.1 |
| 2013/0061298 A1 * | 3/2013 | Longobardi et al. ........... 726/6 |
| 2013/0179944 A1 * | 7/2013 | Kozlay et al. .................. 726/4 |

* cited by examiner

*Primary Examiner* — Krisna Lim
(74) *Attorney, Agent, or Firm* — Sheridan Ross P.C.

(57) ABSTRACT

Systems and methods for providing an authentication credential mismatch warning are disclosed. More particularly, at least one character from an authentication credential required to access a resource is recorded. When a user attempts to enter the required authentication credential, a mismatch warning can be generated if a monitored character is input incorrectly. The user can then revise the authentication credential input, prior to submitting the authentication credential to the resource.

20 Claims, 4 Drawing Sheets

PASSWORD MISMATCH WARNING METHOD AND APPARATUS

FIELD

A password mismatch warning method and apparatus are provided. More particularly, user input of an authentication credential is monitored to determine whether an incorrect character has been entered.

BACKGROUND

Authentication credentials, in the form of user names, passwords, or other login identifiers are commonly required to access resources. Many users have multiple login/password combinations for home, work and possibly other persona. As a result, users are required to remember, write down, or store on their computer and/or other devices the login/password combinations that have been established for resources that they wish to access. While storing a login and password on a computer or device is convenient, it is not the best security practice. As another approach, login and passwords may be reused by a user for multiple resources. However, this is also not the best practice from a security standpoint. Another common technique for dealing with multiple login/password combinations is to use a set of login/password combinations that are rotated or changed between multiple resources. While this limits the number of login/password combinations that a user must remember, it again is not a best security practice.

A related problem, particularly for users who write down or simply commit to memory their login/password combinations, is mixing them up. If for example one enters the wrong login and/or password for a resource, the authentication credentials for a different resource have inadvertently been disclosed. In addition, if more than a defined number of attempts to enter authentication credentials required to access a resource are made, many systems will require a password reset for security reasons. In addition to mixing up authentication credentials, multiple attempts to enter authentication credentials can result from typographical errors (i.e., entry errors). It would be desirable to avoid inadvertent disclosures and/or password resets, and to do so in a way that did not significantly diminish the security procedures associated with a resource.

SUMMARY

Systems and methods for providing an alert or warning to a user that at least one character of a password has been input incorrectly are provided. More particularly, methods as disclosed herein include the recordation of at least one character within an authentication credential, such as a user name and/or password. Such information can be stored for a plurality of resources, such as websites, applications, data stores, access controlled systems or devices, or the like. When a user attempts to access a resource by providing required authentication credentials, the user input is monitored. If monitoring determines that an incorrect character has been entered with respect to at least one character of an authentication credential, a warning can be generated. A user can then reenter the authentication credential, before submitting an incorrect authentication credential, avoiding the potential disclosure of an authentication credential that is operable for a different resource, and/or avoiding the triggering of a reset procedure.

In accordance with further embodiments, a user can access an authentication credential hint. For example, one or more characters of one or more authentication credentials associated with a resource can be presented to the user. In accordance with at least some embodiments, the character that is monitored, and that can be presented to the user, is the first character of the subject authentication credential. In accordance with still other embodiments, different characters can be monitored within each of a plurality of different authentication credential levels. For example, a resource may require as authentication credentials a user name and multiple passwords that must be entered in sequence following entry of the user name. With respect to such an arrangement, a first character of a first authentication credential level, a second character of a second authentication credential level, a third character of a third authentication credential level and so on can be monitored. Still other arrangements are possible. In accordance with still other embodiments, access to an authentication credential hint can be denied unless the user provides a separate password or other authentication credential to access such information. Moreover, it can be appreciated from consideration of the present disclosure, that only a portion (e.g., one character of an authentication credential) needs to be stored with respect to an authentication credential associated with a resource, in order to provide an effective password mismatch warning. Accordingly, security can be maintained at an acceptably high level. In accordance with still other embodiments, a scan for malware can be commenced upon detecting an attempt to enter an authentication credential, to guard against keystroke logging or other malware.

A system in accordance with embodiments of the present disclosure can include a user device or endpoint having a memory and a processor capable of executing an authentication credential character mismatch application operable to perform functions as described herein. More particularly, user input received through a user input device associated with the user device or endpoint that is entered with respect to an attempt to access a resource is monitored. The input from the user can be compared to stored authentication credential information. The stored authentication credential information can include one or more characters of an authentication credential. If at least one of the stored characters is not correctly input by the user, an alert can be generated, for example through a user output device associated with the user device or endpoint. In accordance with still other embodiments, the authentication credential information can be stored in a table that indexes one or more characters of one or more authentication credentials according to associated resources.

Additional features and advantages of embodiments of the present disclosure will become more readily apparent from the following discussion, particularly when taken together with the accompanying drawings.

DETAILED DESCRIPTION

Figure 1:
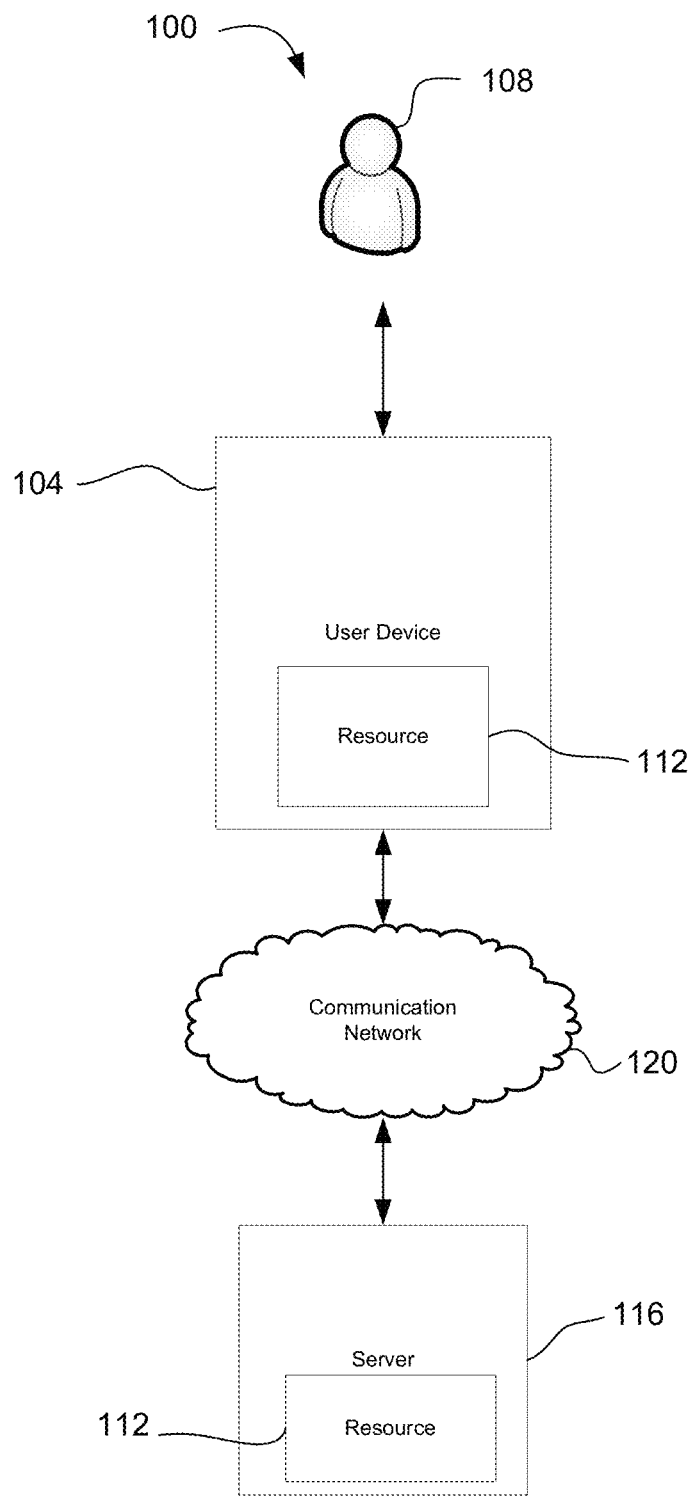
FIG. 1 is a block diagram of a system incorporating an authentication credential character mismatch feature as described herein.

FIG. 1 illustrates components of a system 100 with authentication credential mismatch warning features in accordance with embodiments of the present disclosure. The communication system 100 generally includes a user device or endpoint 104 associated with a user 108. The user device 104 can include a resource 112 that is local to the user device 104. Alternatively or in addition, the system 100 can include a resource 112 that is remote with respect to the user device 104. For example, a resource 112 can be provided by a server 116 or other network node that is in communication with the user device 104, either directly or through a communication network 120.

A resource 112 may comprise any system, operating system, application, website, data, data store, or other resource running, stored on, or associated with, a user device 104 and/or a server 116 or other node, to which access is controlled by, at least in part, the requirement that a user provide appropriate authentication credentials. Moreover, in accordance with embodiments of the present disclosure, such authentication credentials include, at least in part, a login, user name, password, or other credential that requires a user to enter one or more characters through a user input device associated with the user device 104.

In accordance with embodiments of the present disclosure, a user device 104 can include any device capable of receiving input from the user 108 with respect to an authentication credential required in order to access a resource 112. Accordingly, examples of user devices 104 include general purpose computers, laptops, tablet computers, smart phones, navigation systems, entertainment systems, thin client devices, security systems, industrial control systems, environmental control systems, and the like.

A server 116 may comprise a computing device in communication with a user device 104 directly or through an intermediate device or system, such as a communication network 120. Accordingly, examples of a server 116 include a web server, a communication server, a database, or the like.

A communication network 120 may comprise any type of wired and/or wire line network capable of supporting exchanges of information between a user device 104 and a server 116. Accordingly, the communication network 120 may comprise a packet data network, such as a local area network (LAN), and/or a wide area network (WAN). Alternatively or in addition, the communication network 120 may comprise a dedicated connection between two or more devices, including but not limited to a user device 104 and a server 116. In accordance with still other embodiments, the communication network 120 may comprise a circuit based communication network, such as the public switched telephony network (PSTN). Furthermore, the communication network 120 may include any number of individual networks or different network types in various configurations. Moreover, the communication network 120 can use a variety of protocols, alone or in combination, such as Ethernet, Internet protocol (IP), session initiation protocol (SIP), integrated services digital network (ISDN), proprietary protocols, and the like.

Figure 2:
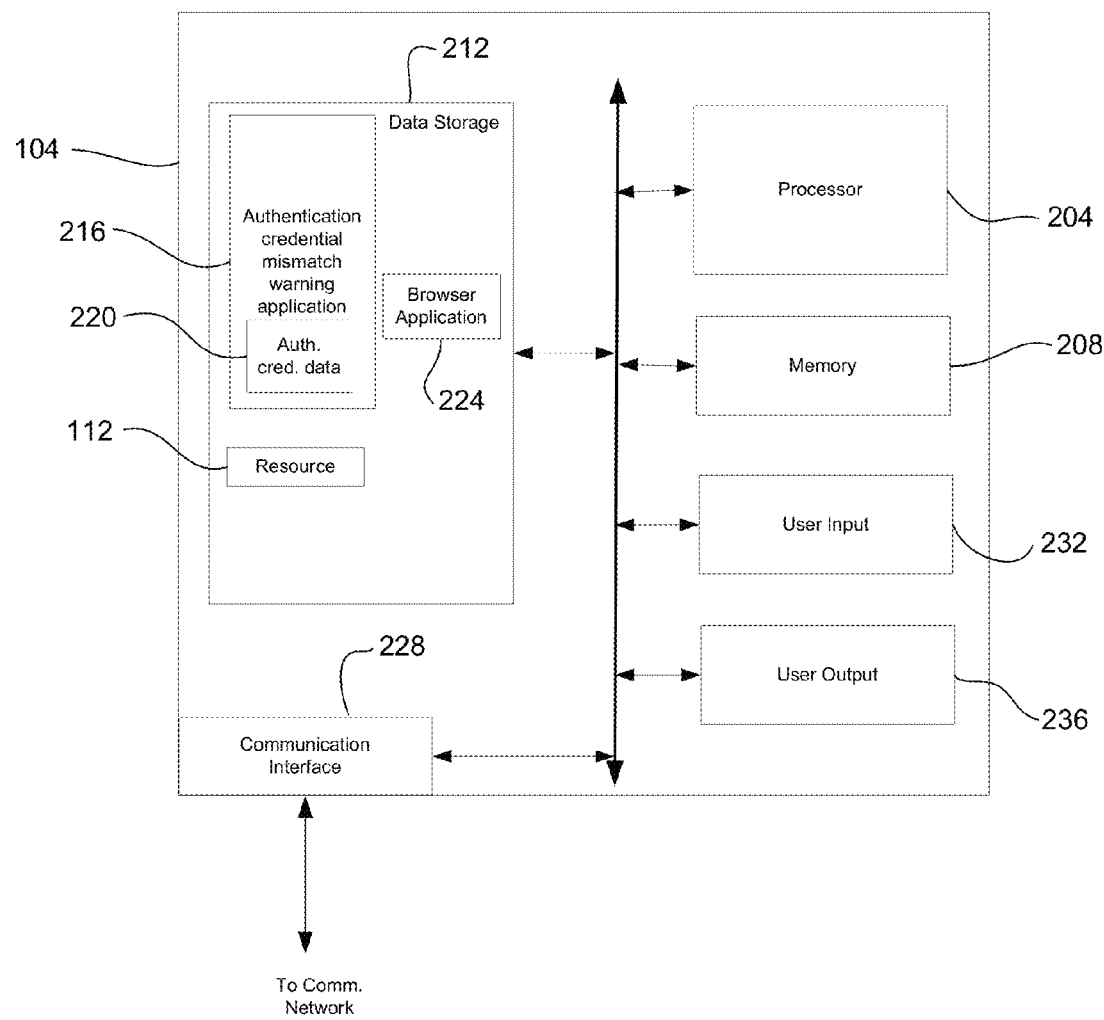
FIG. 2 is a block diagram depicting components of a device incorporating an authentication credential character mismatch warning feature as described herein.

FIG. 2 illustrates components of a user device or endpoint 104 in accordance with embodiments of the present disclosure. In general, the user device 104 can include components of or similar to a conventional computing device. Accordingly, a processor 204 capable of executing program instructions can be provided. The processor 204 may include any general purpose programmable processor or controller for executing application programming or instructions. Alternatively, the processor 204 may comprise a specially configured application specific integrated circuit (ASIC). The processor 204 generally operates to run programming code and/or to execute applications implementing various functions performed by the associated user device 104. For example, where the user device 104 is a general purpose computer, the functions performed by that user device 104 through execution of programming code or applications by the processor 204 can include word processing, voice and/or video telephony, web browsing, numeric analysis, or other functions. In addition, the processor 204 can execute an authentication credential mismatch warning application 216 as described herein.

The user device 104 additionally includes memory 208. The memory 208 can be used in connection with the execution of programming or applications by the processor 204, and for the temporary or long term storage of data and/or program instructions. As examples, the memory 208 may comprise a computer readable medium, such as RAM, SDRAM, or other solid state memory. Alternatively or in addition, data storage 212 may be provided. In accordance with embodiments of the present disclosure, the data storage 212 can contain programming code or instructions implementing various of the applications or functions executed or performed by the user device 104. Like the memory 208, the data storage 212 may comprise a computer readable memory, such as RAM, SDRAM, or other solid state memory. Alternatively or in addition, the data storage 212 may comprise a tangible computer readable medium, such as a hard disk drive or other random access memory.

In accordance with embodiments of the present disclosure, the data storage 212 can include various applications and data. For example, the data storage 212 can include an authentication credential mismatch warning application 216 that monitors user input in the form of an authentication credential entry or attempted entry, and that generates a warning indicating to the user that a character of an authentication credential has been entered incorrectly. The authentication credential mismatch warning application 216 can also include or have access to authentication credential data 220. For example, the authentication credential data 220 can include at least one character of one or more authentication credentials for each of one or more resources. In accordance with at least some embodiments, at least one character for each authentication credential associated with a resource is stored in authentication credential data 220 comprising a table that is indexed or ordered according to an identifier of a resource 112 with which the authentication credential is associated. Moreover, the authentication credential data 220 can include a data set for each user 104 and/or user persona associated with the user device 104. The data storage 212 can additionally contain application programming or data comprising or associated with one or more resources 112. Such application programming or data can be in association with a resource 112 that is entirely or partially local to the user device 104, or that is entirely or partially stored on or associated with a server 116 or other device that is remote with respect to the user device 104. Other examples of applications that can be stored in data storage 212 include a browser application 220. As can be appreciated by one of skill in the art after consideration of the present disclosure, a browser application 220 can be used to access websites or other resources 112 associated with server devices 116. For example, by entering a uniform resource locator (URL), a user 108 can direct a browser 224 to access a resource 112 associated with a website provided by a server 116.

The user device 104 can additionally include a communication interface 228. The communication interface can operate to interconnect the user device 104 to the communication network 120, a server 116, other user devices or endpoints, and the like. Moreover, such interconnections can be through a single port, such as an Internet protocol (IP) port, and/or through multiple ports or interfaces.

A user device 104 also generally includes one or more user input devices 232, and one or more user output devices 236. Examples of user input devices 232 include a keyboard, mouse or other position encoder, microphone, touch screen display, and the like. Examples of user output devices 236 include displays, touch screen displays, speakers, indicator lamps, vibrators, and the like.

Figure 3:
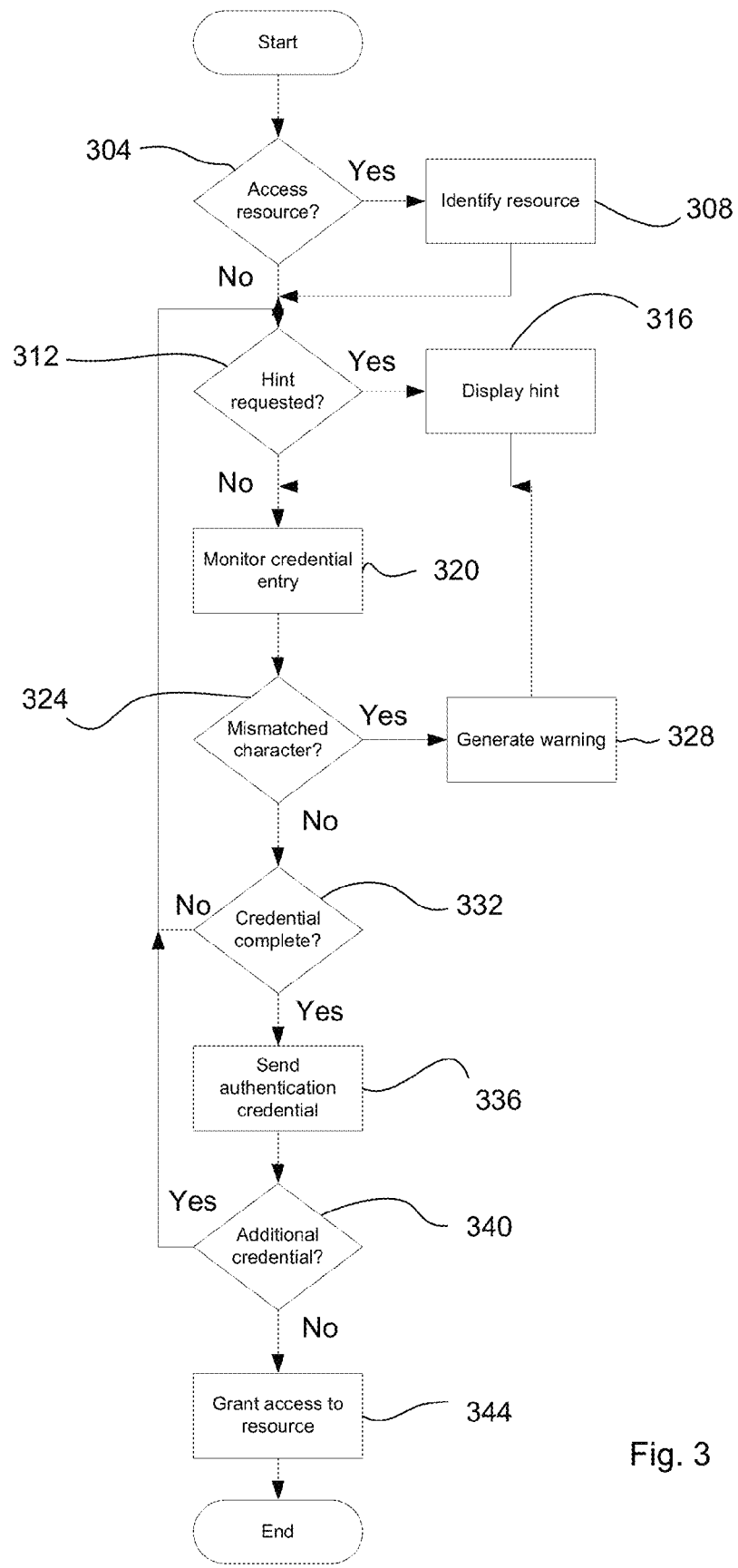
FIG. 3 illustrates aspects of a method for providing an authentication credential character mismatch warning as described herein.

With reference now to FIG. 3, aspects of the operation of a system 100 in accordance with embodiments of the present disclosure are illustrated. More particularly, aspects of the operation of an authentication credential mismatch warning application 216 implemented by or on behalf of a user device 104 are depicted. Initially, at step 304, a determination is made as to whether an attempt to access a resource that requires submission of an authentication credential has been made by a user 108 of the user device 104. This determination can include determining that a user 108 has accessed a log-in page or screen of a resource, or a resource portal. If an attempt to access a resource 112 has been made, the resource 112 is identified (step 308).

After identifying the resource 112 to which access is desired, or after determining that an attempt to access a resource 112 has not been made, a determination may be made as to whether an authentication credential hint has been requested (step 312). A request for an authentication credential hint can be in the form of an explicit request, for example made through the selection by the user 108 of a menu item or input feature provided by a user interface associated with the warning application 216 running on the user device 104. Moreover, the request can comprise or be associated with the provision by the user 108 of an authentication credential required in order to grant access to the hint. As examples, an authentication credential required to access an authentication credential hint may be in the form of a challenge question, password, authentication key, biometric data, or other authentication credential. In accordance with still other embodiments, a hint request can be generated automatically, for example upon detection by the authentication credential mismatch warning application 216 of a presentation of a field or other input facility for providing an authentication credential associated with a resource 112 known to the application 216, the detection of an incorrectly input character of an authentication credential, as described in greater detail elsewhere herein, or the like.

After determining that a proper request for an authentication credential hint has been received, the authentication credential hint may be displayed (step 316). The authentication credential hint that is displayed can include a character of an authentication credential required to grant the desired access to the resource 112 that is recorded as part of the authentication credential data 220. For example, at least one character of an authentication credential, or of each authentication credential, associated with a resource 112 that is recorded in the authentication credential data 220 can be displayed. In addition, the position of the character within the complete authentication credential can be displayed. Moreover, the hint that is displayed or otherwise output to the user 108 by a user output device 236 can include a character included in a particular authentication credential being provided with respect to a resource 112. The character that is displayed can be the first character of the authentication credential, as the first character is more likely to trigger the user's memory as to the complete authentication credential. In general, any number of characters less than all of the characters in an authentication credential can be stored as part of authentication credential data 220. However, the fewer the number of characters, the lower the potential negative impact on the security of the resource 112 associated with the authentication credential. In accordance with at least some embodiments, a user can control which character of an authentication credential is stored and/or available as a hint. As yet another example, at least one character from each authentication credential associated with a resource 112 can be provided to the user 108 simultaneously.

At step 320, user input received at a user input device 232 from the user 108 comprising an authentication credential is monitored. Such monitoring can include determining whether one or more characters of an authentication credential associated with the resource have been correctly entered. As can be appreciated by one of skill in the art after consideration of the present disclosure, monitoring the input of an authentication credential can include monitoring the character that is input at one or more character positions of an authentication credential. At step 324, a determination is made as to whether a mismatched authentication credential character has been input. For example, where the authentication credential mismatch warning application 216 has stored as part of authentication credential data 220 a single character of an authentication credential and the position within the authentication credential of that one character, the authentication credential mismatch warning application 216 through monitoring the credential entry determines whether an incorrect character has been input at the character position of the at least one character. If an incorrect character is entered at that position, a warning is generated (step 328). The warning 328 can be in the form of an output signal provided to the user 108 through one or more user output devices 236. In accordance with at least some embodiments of the present disclosure, the warning is generated prior to the authentication credential, in this case an incorrect authentication credential, being provided to the resource 112 being accessed, or a security proxy for such resource 112. Accordingly, the sending of an authentication credential that might be valid for another resource 112, and/or the triggering of a password reset requirement, can be avoided. After generating a warning at step 328, the process can return to step 320, and character entry can continue to be monitored.

In accordance with at least some embodiments of the present disclosure, a first character (i.e., the character occupying the first position) of an authentication credential is stored as part of authentication credential data 220 for a resource 112. That first character can then be provided to the user 108 as a hint. By maintaining a record of the first character, such that the first character of the authentication credential can be provided as a hint, the user 108 can be prompted as to the correct authentication credential, particularly where the authentication credential is in the form of a user name, word, or phrase. In accordance with still other embodiments, characters included in an authentication credential occupying positions other than the first position can be recorded and monitored. By using different character positions, any negative impact on the security of the system can be minimized or reduced as compared to using the first character, or always using the first character of the authentication credential. Moreover, for example in connection with a resource 112 associated with multiple layers of authentication credentials, such as a user name in combination with one or a plurality of passwords, different character positions of different authentication credentials can be stored and monitored. Notably, the authentication credential data 220 can include a record of less than all of the characters included in an authentication credential. Instead, one or a limited number of characters and their positions are stored with respect to an authentication credential, to enable the provision of a hint and/or an ability to warn a user that an incorrect password or character has been entered, without significantly affecting the security of the associated resource 112.

If a mismatched character is not detected at step 324, for example if a correct character has been entered, or if a character associated with a position that is not monitored by the authentication credential mismatch warning application 216 is entered, a determination can be made as to whether entry of the authentication credential is complete (step 332). If entry of the authentication credential is complete, the authentication credential can be sent to the resource 112, or to a security proxy for that resource 112 (step 336). As can be appreciated by one of skill in the art after consideration of the present disclosure, the steps of determining whether entry of an authentication credential is complete and of sending the authentication credential can be performed by the user 108. Alternatively, these steps can be performed automatically, for example through operation of the authentication credential mismatch warning application 216, for example where that application 216 is aware of the number of characters within a particular authentication credential. If entry of the authentication credential is not complete, the process can return to step 312.

After sending the authentication credential, a determination can be made as to whether authorization with respect to a resource 112 is complete (step 340). If authorization is complete, and if proper authentication credentials have been presented, access to the resource may be granted (step 344). Alternatively, if an authentication credential is missing, for example because it has not yet been entered, or because it has been incorrectly entered, the process can return to step 312, and the user can request additional hints and/or continue to enter authentication credentials. As can be appreciated by one of skill in the art after consideration of the present disclosure, determining whether authorization is complete, and granting access to the resource 112 or requiring additional authentication credentials can be performed by the resource 112 and/or by a security proxy for the resource 112. In addition, where additional authentication credentials and/or corrected authentication credentials are required, additional steps of requiring an authentication credential reset or other security procedures may be performed. After granting access to the resource 112, the process can end.

Figure 4:
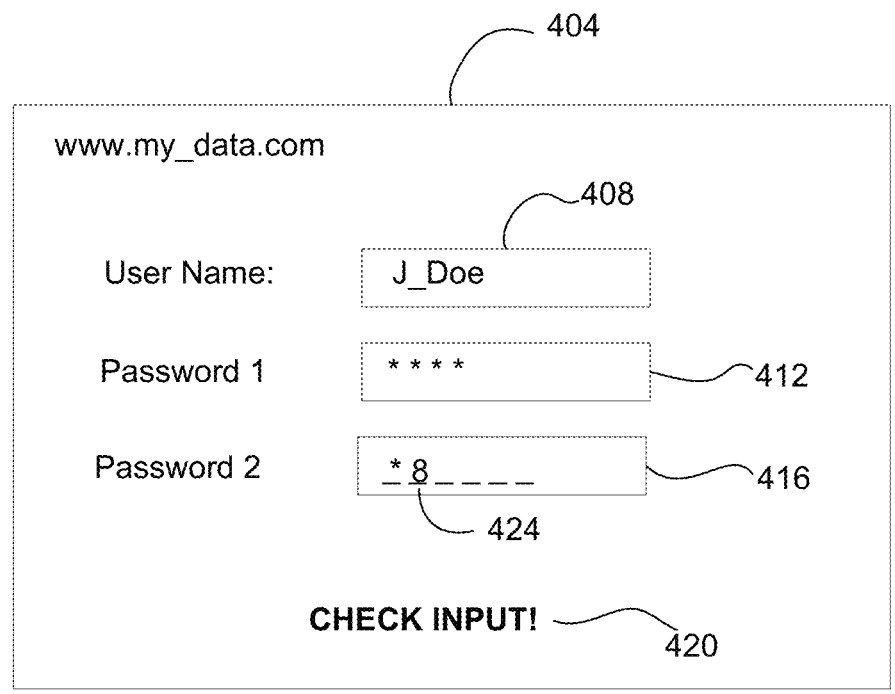
FIG. 4 illustrates a user interface for receiving authentication credentials in accordance with embodiments of the present disclosure.

With reference now to FIG. 4, a user interface 404, for example as provided through a user output 236 of a user device 104, is depicted. More particularly, the user interface 404 includes input fields for receiving authentication credentials from the user 108. In this example, the resource is a website identified by the address "www.my_data.com". The authentication credentials associated with this example resource 112 include a user name 408, a first level password 412, and a second level password 416. As shown, the user 108 has entered a user name 408, a first password 412, and the first two characters of the second password 416. In this example, at least one of the monitored characters of the second password 416 has been entered incorrectly. As a result, through operation of the authentication credential warning application 216 of the user device 104, an authentication credential mismatch warning 420 has been generated. In addition, a monitored character 424 of the second password 416 has been presented as part of the user interface 404, as an authentication credential hint. Specifically, in this example, the monitored character 424 of the second password 416 should be the number 8. In response to receiving as input a character other than the number 8 in the monitored character position (here the second position) of the second password 416, the authentication credential mismatch warning 420 was generated, and the correct character for the monitored character position was output. By providing the warning 420, the input being entered by the user 108 can be revised before the incorrect authentication credential is sent to the resource 112. In addition, where a hint is provided, the user 108 can be reminded of at least a monitored character included in an authentication credential, to assist the user 108 in providing an appropriate authentication credential for the subject resource 112.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
   accessing a first stored character stored locally on a device, the first stored character comprising a character of a first authentication credential, wherein the first authentication credential comprises a plurality of characters and the first stored character comprises a number of characters that is less than the plurality of characters of the first authentication credential;
   monitoring, by the device, a first entered character comprising a portion of a user's entry of an attempted first authentication credential;
   determining, by the device, whether the first entered character matches the first stored character; and
   upon determining that the first entered character does not match the first stored character, outputting an alert prior to authenticating the attempted first authentication credential.

2. The method of claim 1, wherein the first stored character and the first entered character each further comprise a same plurality of characters and the same plurality of characters is less than all characters of the first authentication credential.

3. The method of claim 1, wherein determining whether the first entered character matches the first stored character further comprises determining whether the first entered character is in a character position of the attempted first authentication credential and the first stored character is in the same character position of the first authentication credential.

4. The method of claim 3, wherein the character position is the first position.

5. The method of claim 1, wherein at least one character of the first authentication credential is mnemonically associated with a first resource to serve as a trigger for the user's memory as to the remainder of the first authentication credential.

6. The method of claim 1, further comprising:
   accessing a second character of a second authentication credential, wherein the first authentication credential is a first level authentication credential associated with the first resource, and wherein the second authentication credential is a second level authentication credential associated with the first resource.

7. The method of claim 1, further comprising:
accessing a first character of a second authentication credential, wherein the first character of the first authentication credential is associated with a first resource, and wherein the first character of the second authentication credential is associated with a second resource.

8. The method of claim 1, further comprising:
in response to the input, performing a scan for malware, wherein the scan is performed prior to generating an alert signal.

9. The method of claim 1, wherein the step of generating an alert signal for presentation to the user prior to authenticating the first authentication credential, further comprises presenting the alert prior to the user requesting authentication utilizing the completed first authentication attempt.

10. The method of claim 1, wherein the step of generating an alert signal for presentation to the user prior to authenticating the first authentication credential, further comprises presenting the alert prior to the user inputting a subsequent character of the first authentication attempt.

11. The method of claim 1, further comprising
upon receiving a user's indication that entry of the attempted first authentication credential is complete, causing the attempted first authentication credential to be authenticated by a remote computer, and wherein the step of causing the attempted first authentication credential to be authenticated by a remote computer occurs without regard to whether the first entered character does not match the first stored character.

12. A non-transitory computer readable medium having stored thereon computer executable instructions, the computer executable instructions causing a processor of a device to execute a method for providing an authentication credential mismatch warning, the computer executable instructions comprising:
instructions to access a first stored character stored locally on the device, the first stored character comprises a character of a first authentication credential and the first stored character comprises a number of characters that is less than the plurality of characters of the first authentication credential;
instructions to monitor, by the device, a user input of an attempted first authentication credential, the input comprising a first entered character;
instructions to determine, by the device, whether the first entered character matches the first stored character; and
instructions to, upon determining that the first entered character does not match the first stored character, causing a warning to be presented prior to authenticating the first authentication credential.

13. The non-transitory computer readable medium of claim 12, wherein the first entered character is the first character of the first authentication credential.

14. The non-transitory computer readable medium of claim 13, the computer executable instructions further comprising:
instructions to access a second stored character, stored locally on the device, wherein the second stored character comprises a character of a second authentication credential;
instructions to monitor, by the device, the user input of an attempted second authentication credential, the input comprising a second entered character;
instructions to determine, by the device, whether the second entered character matches the second stored character; and
instructions to, upon determining that the second entered character does not match the second stored character, causing a warning to be presented prior to authenticating the second authentication credential.

15. The non-transitory computer readable medium of claim 14, wherein the first authentication credential is a user name, and wherein the second authentication credential is a password.

16. The non-transitory computer readable medium of claim 12, the computer executable instructions wherein the first stored character is mnemonically associated with a first resource to serve as a trigger for the user's memory as to the remainder of the first authentication credential.

17. The non-transitory computer readable medium of claim 16, the computer executable instructions further comprising:
instructions to display the first entered character.

18. The non-transitory computer readable medium of claim 17, the computer executable instructions further comprising:
wherein the first stored character and the first entered character each further comprise a same plurality of characters and the same plurality of characters is less than all characters of the first authentication credential.

19. A system for providing a warning of an authentication credential character mismatch, comprising:
memory;
an authentication credential character mismatch application stored in the memory;
authentication credential data stored in the memory, wherein the authentication credential data stored in memory includes at least one but less than all characters included in an authentication credential;
a user input;
a user output;
a processor, wherein the processor is operable to execute the authentication credential character mismatch application, wherein user input comprising at least one character of the authentication credential is compared to the authentication credential data stored in memory, and wherein in response to a mismatch between the at least one character of the authentication credential and the authentication credential data stored in memory being detected, present a mismatch warning on the user output prior to authenticating the second authentication credential.

20. The system of claim 19, further comprising:
an authentication command, triggered by an input on the user input, causing the authentication credential to be transmitted to a remote computer for authentication without regard to whether the authentication credential character mismatch application detected a mismatch.

* * * * *